UNITED STATES PATENT OFFICE.

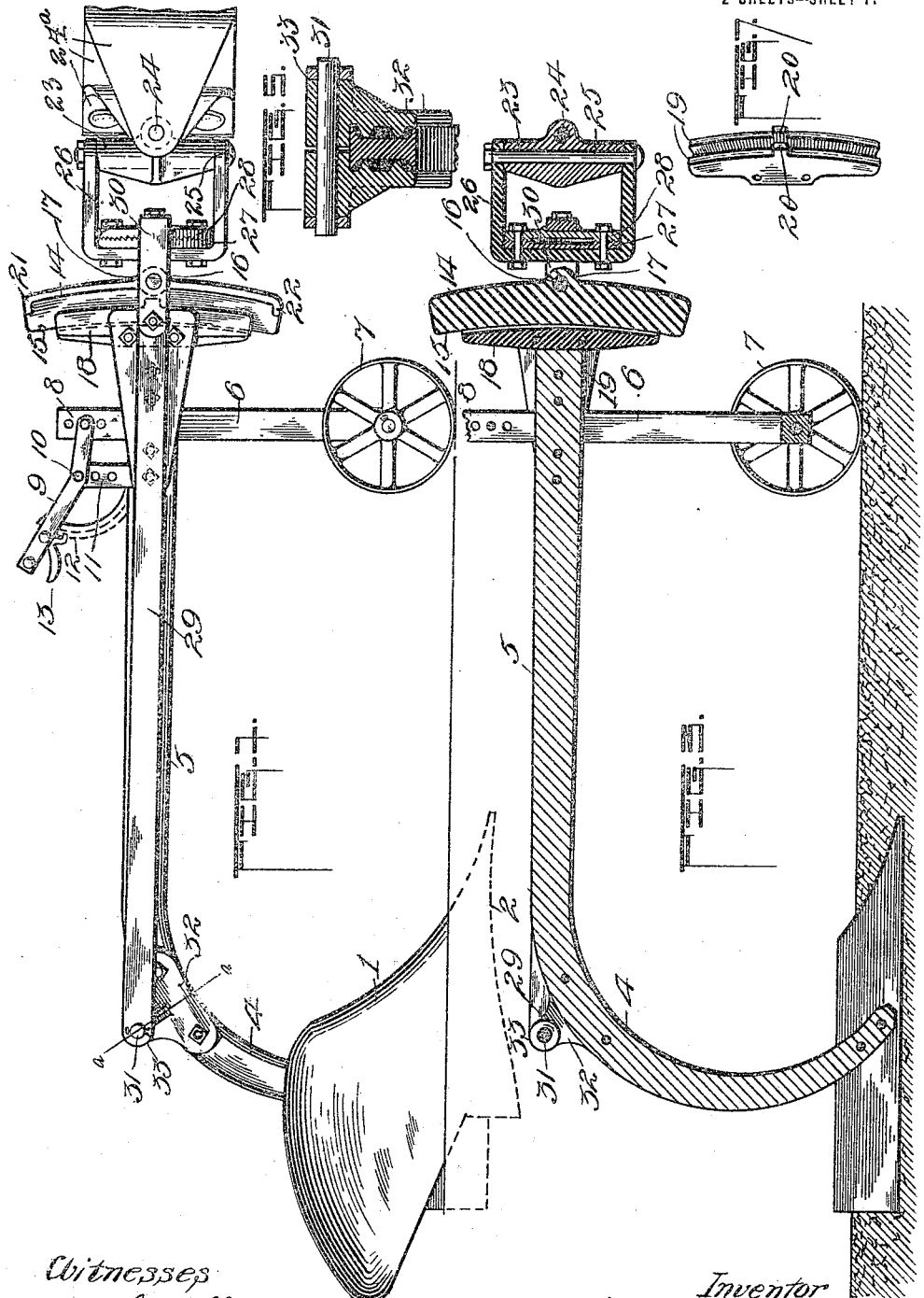

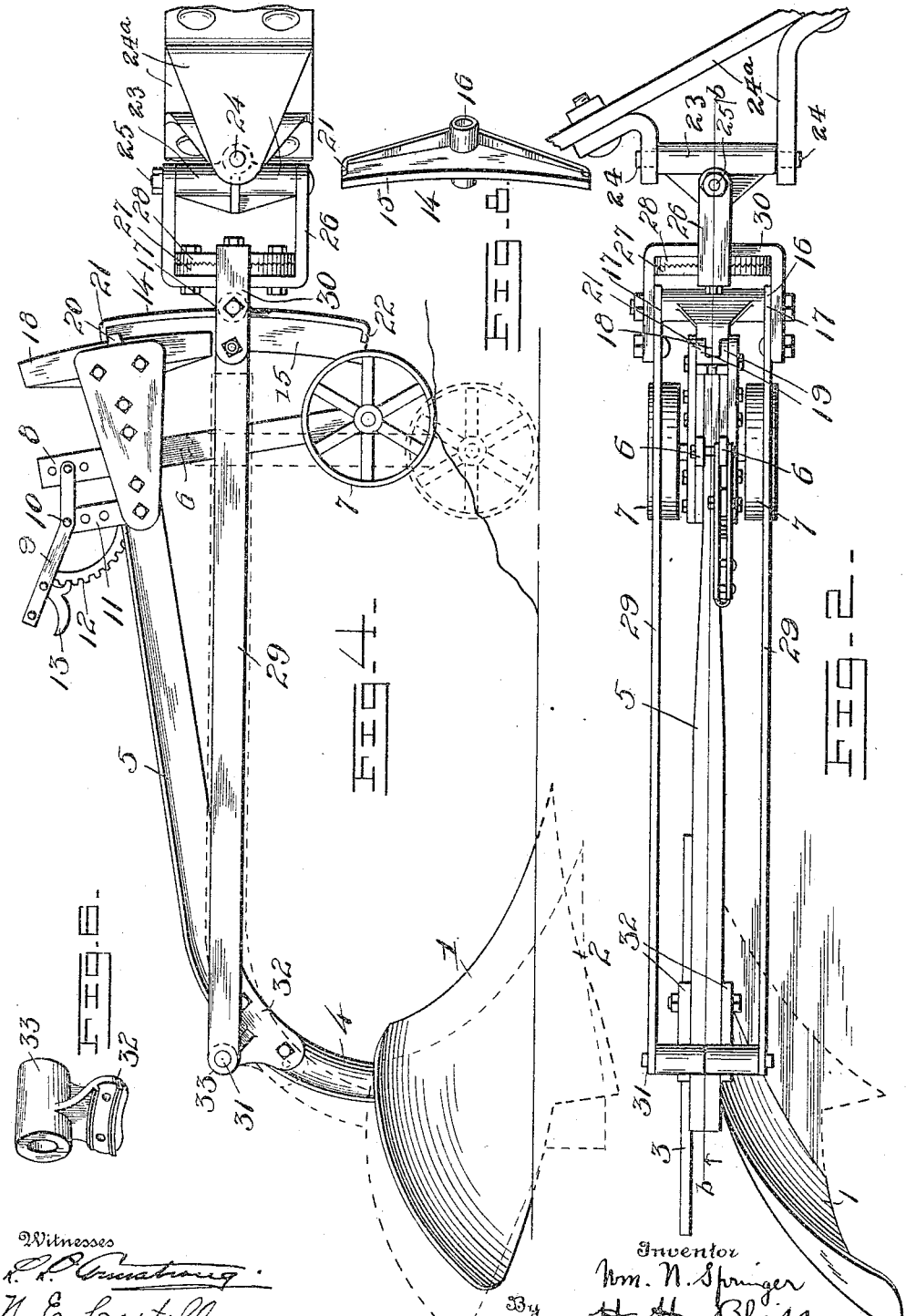

WILLIAM N. SPRINGER, OF PEORIA, ILLINOIS, ASSIGNOR, BY MESNE ASSIGNMENTS, TO AVERY COMPANY, A CORPORATION OF ILLINOIS.

PLOW.

1,209,898.  Specification of Letters Patent.  Patented Dec. 26, 1916.

Application filed August 9, 1907, Serial No. 387,896.  Renewed May 16, 1916.  Serial No. 97,961.

*To all whom it may concern:*

Be it known that I, WILLIAM N. SPRINGER, a citizen of the United States, residing at Peoria, in the county of Peoria and State of Illinois, have invented certain new and useful Improvements in Plows, of which the following is a specification, reference being had therein to the accompanying drawing.

This invention relates to improvements in gang plows. Plows of this character comprise a main or gang frame and a series of individual plows coupled to the rear side of the frame, the latter being adapted to be hitched to an engine or other suitable tractor.

The object of the invention is to provide a construction such that the plows will tend automatically to maintain themselves in proper working positions in the ground while passing over ground that is rough, uneven and rocky as well as in the case of soil that is more level and uniform.

Other minor objects and the nature of the invention, in detail, will be understood from the following description in connection with the drawings.

Figure 1 is a side elevation of a plow embodying my improvements, showing the means for attaching it to the draft-frame of a steam gang plow. Fig. 2 is a top plan view of the same. Fig. 3 is a central vertical section on the line *b, b* of Fig. 2. Fig. 4 is a side elevation showing the beam and its immediate attachments in relatively elevated positions. Figs. 5 to 8, inclusive, show details or parts detached.

In the drawings, a plow body is shown having the mold-board 1, a share at 2, and a land side 3. These parts may be of any usual or preferred sort. They are attached to a beam having the upward extending part or standard 4 and the horizontal, forward extending, part 5. To the front end of the beam there are attached the supporting end guiding devices. 6, 6 are standards or bars slidably mounted in guides on the forward part of the beam and extending down far enough to provide supports for the wheels 7, 7, which run upon the surface of the ground. The upwardly projecting parts 8 of these standards are adjustably connected to the lever 9, which is pivoted at 10 to arm 11, extending upward from the beam. By means of the lever the beam can be adjusted up or down along the standards 6. A toothed segment at 12 and a detent or dog at 13 constitute the devices by which the lever 9 can be locked in any position of adjustment. When the beam is lowered in relation to the wheels and fastened in a relatively low position, the plow is caused to tend to enter more deeply into the ground. Vice versa, when the lever is adjusted so as to lift the beam relatively to the wheels 7, the plow is caused to tend to travel upward.

The beam is firmly braced against lateral displacement by the following devices: 14 is a guide having a curved web or plate 15, and a pivot bearing at 16, it being supported in the draft bars at 17. With this guide there is combined a movable guide-piece 18, secured to the forward end of the beam. It has two plates 19 lying one on one side and the other on the other side of the web 15 of the guide 14. The up and down play of the beam in relation to the guide 14 is limited by the projections 20 carried by the guide-piece 18, on the beam, and the stops 21, 22, at the upper end and the lower end, respectively, of the guide 14.

Connection with the main or gang frame is made as follows: 23 is a coupler piece secured by a pivot pin 24 to the main frame 24ª so that said coupler piece is free to swing vertically about the pivot 24. The coupler piece has an upright tubular part which receives a pin or bolt 25 that serves to pivotally connect to the coupler piece the stirrup 26. 27, 28 are adjustable rose plates secured to the stirrup 26. To the plate or disk 28 are secured the draft bars 29, these at their forward ends being connected together preferably by a loop or stirrup 30 which is fastened to the rose-plate 28. The draft-bars 29 extend backward and are pivotally connected at 31, to the beam directly above the plow bottom. The connecting devices are the brackets 32 secured to the beam, one upon one side and the other upon the other. These brackets have tubular bearings 33, and the draft bars 29 are fastened by the pivot device 31 passing through the bars and through the tubular bearings 33.

The mode of operation of devices such as described will be readily understood. The draft being applied to the plow beam at a point to the rear of the gage wheels 7, 7, and well above the plow body, it will be seen that reaction of the soil on the plow body tends always to swing the plow body rearward about the draft connection with the beam and to correspondingly force the front end of the beam and the gage wheel downward. In other words, the plow beam may be considered a lever having its fulcrum at 31 with the plow body mounted on one arm of the lever and the gage wheel on the other, the force being applied, as stated, to the plow body so as to swing the latter rearward and the gage wheel downward. Thus, if a boulder is encountered, the gage wheels 7 in riding up over the boulder, swing the point of the plow upward as indicated in Fig. 4 so as to clear the boulder, and as soon as the plow body encounters the soil after passing the boulder, the backward drag tends to swing the front end of the beam downward so that the point of the plow takes into the soil promptly and restores the parts quickly to normal working position. On the other hand, in passing over ground which is uneven because of depressions, it will be seen that the constant downward pressure on the front end of the beam will cause the gage wheels to closely follow the surface of the ground in passing such depressions so that the soil at these points is plowed to the desired depth. It will be seen that these vertical swinging movements of the plow body and plow beam are possible by reason of the fact that the front end of the beam can freely rise and fall, within the limits provided by the guide devices 14 and 18, relative to the pivotal connection at 24 with the main frame. In addition to the swinging movement of the plow about the connection at 31, it will, of course, be understood that the plow is permitted to rise and fall bodily as the draft bars swing about the pivotal connection 24 with the main frame. At the same time, the plow as an entirety, including the draft bars, is free to swing laterally, and this without interfering with any of the movements of the plow in vertical planes. The rose plate coupling embodied in the draft frame structure provides a simple and effective means for winging the individual plows.

What I claim is:

1. In a gang plow, the combination of a main frame, a draft bar pivoted to the main frame with freedom to swing vertically about the pivotal connection, a plow comprising a body part and a beam, a ground abutting device mounted on the beam in front of the plow body, and a pivotal connection between the draft bar and plow beam at a point to the rear of the ground abutting device, the said pivotal connection permitting the plow body and beam to swing in longitudinal vertical planes relatively to the draft bar under the control of the said ground abutting device.

2. In a gang plow, the combination of a main frame, a draft bar pivoted to the main frame with freedom to swing vertically about the pivotal connection, a plow comprising a body part and a beam, a ground abutting device mounted on the beam in front of the plow body, means for adjusting the ground abutting device up and down relatively to the plow beam, and a pivotal connection between the draft bar and the plow beam at a point to the rear of the ground abutting device, said pivotal connection permitting the plow body and beam to swing in vertical planes relative to the draft bar.

3. In a gang plow, the combination of a main frame, a draft bar pivotally connected to the main frame with freedom to swing in longitudinal vertical planes and horizontal planes, a plow comprising a body part and a beam, a ground abutting device mounted on the beam in front of the plow body, and a pivotal connection between the draft bar and the plow beam at a point to the rear of the ground abutting device, the said pivotal connection permitting the plow body and the beam to swing in longitudinal vertical planes relative to the draft bar.

4. In a gang plow, the combination of a main frame, a draft bar pivoted to the main frame with freedom to swing vertically about the pivotal connection, a plow comprising a body part and a beam, a ground abutting device mounted on the beam in front of the plow body, a pivotal connection between the draft bar and the plow beam at a point to the rear of the ground abutting device, the said pivotal connection permitting the plow body and the beam to swing in vertical planes relative to the draft bar, and means permitting adjustment of the draft bar about a longitudinal axis to effect winging of the plow.

5. In a gang plow, the combination of a main frame, a draft bar pivotally connected to the main frame with freedom to swing in longitudinal vertical planes and longitudinal horizontal planes, a plow comprising a body part and a beam, a ground abutting device mounted on the beam in front of the plow body, a pivotal connection between the draft bar and the plow beam at a point to the rear of the ground abutting device, the said pivotal connection permitting the plow body and the beam to swing in longitudinal vertical planes relative to the draft bar, and means permitting adjustment of the draft bar about a longitudinal axis to effect winging of the plow.

6. In a gang plow, the combination of a main frame, a draft bar pivoted to the main frame with freedom to swing vertically about the pivotal connection, a plow comprising a body part and a beam, a ground abutting device mounted on the beam in front of the plow body, a pivotal connection between the draft bar and plow beam at a point to the rear of the ground abutting device, the said pivotal connection permitting the plow body and beam to swing in longitudinal vertical planes relatively to the draft bar under the control of the said ground abutting device, and means engaging the front end of the beam and serving to prevent lateral movement thereof with respect to the draft bar, without preventing free vertical movement.

7. In a gang plow, the combination of a main frame, a draft bar pivoted to the main frame with freedom to swing vertically about the pivotal connection, a plow comprising a body part and a beam, a ground abutting device mounted on the beam in front of the plow body, a pivotal connection between the draft bar and plow beam at a point to the rear of the ground abutting device, the said pivotal connection permitting the plow body and beam to swing in longitudinal vertical planes relatively to the draft bar under the control of the said ground abutting device, a vertical guide rib secured to the draft bar and having its rear edge concentric with the pivotal connection between the bar and the beam, and means on the beam engaging opposite sides of the rib and serving to prevent relative lateral movement of the front end of the beam.

8. In a gang plow, the combination of a main frame, a draft bar pivoted to the main frame with freedom to swing vertically about the pivotal connection, a plow comprising a body part and a beam, a ground abutting device mounted on the beam in front of the plow body, a pivotal connection between the draft bar and plow beam at a point to the rear of the ground abutting device, the said pivotal connection permitting the plow body and beam to swing in longitudinal vertical planes relatively to the draft bar under the control of the said ground abutting device, means permitting adjustment of the draft bar about a longitudinal axis to effect winging of the plow, a vertical guide rib secured to the draft bar and having its rear edge concentric with the pivotal connection between the bar and the beam, and means on the beam engaging opposite sides of the rib and serving to prevent relative lateral movement of the front end of the beam and relative angular movement of the beam as a whole about a longitudinal axis.

9. In a gang plow, the combination of a main frame, a draft bar pivoted to the main frame with freedom to swing vertically about the pivotal connection, a plow comprising a body part and a beam, a ground abutting device mounted on the beam in front of the plow body, a pivotal connection between the draft bar and plow beam at a point to the rear of the ground abutting device, the said pivotal connection permitting the plow body and beam to swing in longitudinal vertical planes relatively to the draft bar under the control of the said ground abutting device, a vertical guide rib secured to the draft bar and having its rear edge concentric with the pivotal connection between the bar and the beam, means on the beam engaging opposite sides of the rib and serving to prevent relative lateral movement of the front end of the beam, and stops at the ends of the guide rib for limiting the vertical movement of the front end of the beam.

In testimony whereof I affix my signature, in presence of two witnesses.

WILLIAM N. SPRINGER.

Witnesses:
G. W. PERRY, Jr.,
A. L. GREGENY.

Copies of this patent may be obtained for five cents each, by addressing the "Commissioner of Patents, Washington, D. C."